United States Patent [19]

Trumble

[11] Patent Number: 4,567,115

[45] Date of Patent: Jan. 28, 1986

[54] PRESSURE IMPREGNATION OF WOOD POLES FOR PRESERVATION

[75] Inventor: William P. Trumble, Kanata, Canada

[73] Assignee: Bell Canada, Montreal, Canada

[21] Appl. No.: 635,868

[22] Filed: Jul. 30, 1984

Related U.S. Application Data

[63] Continuation-in-part of Ser. No. 450,428, Dec. 16, 1982, abandoned.

[51] Int. Cl.⁴ ............................................. B27K 3/36
[52] U.S. Cl. ................................. 428/541; 106/15.05; 106/18.26; 106/18.36; 106/297; 424/137; 427/297; 427/440; 428/537.1
[58] Field of Search .............................. 427/440, 297; 106/18.26, 18.28, 18.36, 15.05, 297; 424/137; 428/537.1, 544

[56] References Cited

U.S. PATENT DOCUMENTS 3,832,463  8/1974  Nicholson .................. 106/18.36
4,313,976  2/1982  Leach ......................... 424/137

OTHER PUBLICATIONS

Moilliet et al., "Surface Activity" Van Nostrand Co. Princeton, NJ, 1961, TP149M61961C2, p. 466.

Primary Examiner—Norman Morganstern
Assistant Examiner—Janyce Bell
Attorney, Agent, or Firm—Schwartz, Jeffery, Schwaab, Mack, Blumenthal & Evans

[57] ABSTRACT

A treatment for wood poles, as used for telecommunications and electric power poles, to reduce surface hardening comprises modifying the standard treatment solution by the addition of a polymer of ethylene oxide. A surface active agent is a further possible additive, and reduction of the hexavalent chrome ion in the standard solution is a further modification.

22 Claims, No Drawings

PRESSURE IMPREGNATION OF WOOD POLES FOR PRESERVATION

This invention relates to the preservation of wood poles, particularly wood poles as are used for telecommunications and electric power cables. This application is a Continuation-in-Part Application of Ser. No. 450,428, filed Dec. 16, 1982, now abandoned.

Telephone and other poles are conventionally treated with chrome copper arsenate type preservatives. However a problem with such preservatives is that there is a tendency for the outer portion of a pole, the sapwood, to harden. This creates problems for servicing personnel who climb the poles using climbing spurs clamped to their boots. The hard sapwood restricts entry of spurs. Also checking of the wood can occur.

The present invention relates to the modifying of the chrome copper arsenate solution to avoid, or at least reduce, hardening of the sapwood, with improved pole climbability.

From experience it has been found that, as stated above, the chrome copper arsenate treatment tends to make the surface of treated poles harder than the corresponding white stock, or untreated stock. It has been found that hard surface poles have a higher concentration of chrome ion near the surface than in other areas of the poles radial cross-section. The chrome is the apparent reason in the hardening phenomenon, as amoniacal copper arsenate and acid copper arsenate do not appear to harden the wood as much as chrome copper arsenate does. The reason for the preservative concentration at the surface nor the cause of hardening of the wood is not fully understood.

There appears to be at least two plausible reasons for the high concentration of the preservative salts at the surface of the wood. One reason is that the outerwood, or sapwood, is more porous than the inner wood, or heartwood. Because of its porosity, the sapwood is more capable of holding a solution than is the heartwood, and the chrome reacts with the reactive sites in the wood material matrix. Another reason considered, for the high concentration, is that the hexavalent chrome oxide is so active with the sugars and other materials in the sapwood that the combination forms a semi-solid product that blocks further penetration of preservation into the wood matrix.

The actual mechanism of hardening of the pole surface is even more obscure than the mechanism of concentration of chrome ion. One theory is that the chrome oxide converts some of the lignin and sugars to a water soluble compound, which is then extracted from the wood, similar to weathering. The remaining cellulose-lignin composite then shrinks resulting in a case hardening mechanism. Another theory is that chrome oxide reacts to polymerize the lignin phase of the cellulose-lignin composite to form a cellulose-chrome lignin composite that is harder than the original composite. Neither of these theories are proven, but it has been found that these two reactions can exist.

After considering the problems and finding out the feature of concentration of chrome ion near the surface of the pole, and developing the above related reasons and theories, it is still not obvious as to what should be done to alleviate the problems. It is proposed to provide a variation in the preservative solution to give a formulae which, while retaining the preservative action, will mitigate hardening. One treatment is to use a polymer of ethylene oxide, generally referred to as polyethylene glycol (PEG). A preferred molecular weight range is from about 500 to 2,000, although down to 100 has been used, but is not fully effective. The concentration can vary from about 0.5 to 10% volume.

The basic solution used is a standard Chromated Copper Arsenate, as specified in the ASTM standard D1625-71. The particular solution is referred to as CCA (chromated copper arsenate) and the preferred example is Type C. The composition of this solution is as follows: Hexavalent chromium, calculated as $CrO_3$ 44.5–50.5%; Bivalent copper, calculated as $CuO$ 17.0–21.0%; Pentavalent arsenic, calculted as $As_2O_5$ 30.0–38.0%. The nominal composition is considered as 47.5% $CrO_3$, 18.5% $CuO$ and 34% $As_2O_5$. This standard is well known and widely used.

The basic solution is diluted by the addition of water to make a 2%–2.5% standard water based solution, by adding 40 to 50 parts of water to one part of solution. This again is a well known standard solution for wood treatment. In a particular embodiment, to the standard water based solution is added a 10% concentration of 1000 molecular weight polymer of ethylene glycol (PEG 1000).

It has been proposed to add fatty acids to the standard water based solution. However these additives did not prove satisfactory. It was found that the chromium in the solution attacked the fatty acids and the additive became precipitated. On application to wood, the additive stays at or near the surface and is eventually backed away by rain.

It was opinioned that the same results would occur when a polymer of ethylene glycol (PEG) was added, with the likelihood that the chromium would also precipitate. Experts in the field of wood preservation, on being approached with the present invention, were doubtful of the possibility of producing a wood preserving solution by the present invention and were unable to produce a stable solution.

However, it is possible to produce a stable solution. The PEG is added to the standard water based CCA solution slowly and steadily, to obtain even distribution. The solution should remain at about 75° F., a preferred range being about 70°–85° F. By keeping the solution below 85° F., and preferably about 75° F., reaction between the chromium and the PEG is minimized. The pH is preferably kept below 2.0, a preferred range being 1.7 to 2.0. Keeping the solution cool enables the pH value to be kept within the preferred range.

The polymer acts as a "moisturizer" for the wood matrix and as a buffer for the chrome oxide to retard its aggressive chemical reactivity to wood sugars, ligins, etc. The moisturizing action of the PEG 1000 occurs in that the PEG fills the pores of the wood and then attracts and binds water to its own matrix. This is believed to impart softening to the outer surface of the wood, provide some lubricity for climbing spurs and at least reduce checking or splitting in the pole.

A further example is the addition of a surface active agent to aid penetration of the heartwood, to reduce the concentration in the sapwood. An additional effect is the possibility of allowing the excess chrome to be easily withdrawn on irrigation by fresh water.

Another example is to reduce the hexavalent chrome ion present, for example, to ⅔ of that of the normal solution. This also increases penetration.

As explained, the actual mechanisms resulting in the hardening of the pole surface is not fully understood.

However, by considering the various problems and effects it has been possible to propose novel treatments which are effective, even though it is not fully understood how the treatments provide the desired results.

The poles are treated with the solutions in the conventional way, that is by positioning in a chamber which is first evacuated to extract a much air as possible and then pressurizing with the treatment solution.

What is claimed is:

1. A method of treating wood, comprising the step of exposing wood to an aqueous solution consisting essentially of water, hexavalent chromium, copper, arsenic and polyethylene glycol.

2. A method as claimed in claim 1, wherein said polyethylene glycol has a molecular weight in the range from about 100 to about 2,000.

3. A method as claimed in claim 2, wherein said molecular weight range of said polyethylene glycol is from about 500 to about 2,000.

4. A method as claimed in claim 3, comprising the steps of treating said wood with an aqueous solution consisting essentially of (1) water, (2) about 2 to 2.56% concentration of chromium, copper and arsenic salts or oxides and (3) about 0.5% to 10% concentration of a polyethylene glycol having a molecular weight of about 1,000.

5. A method as claimed in claim 1, wherein said aqueous solution further consists essentially of a surface active agent.

6. A method as claimed in claim 1, wherein said exposing step comprises treating said wood in a chamber by first evacuating said chamber for a first predetermined period after placing said wood in said chamber, and then pressure treating said wood with said aqueous solution at a predetermined pressure for a second predetermined period.

7. A method as claimed in claim 1, wherein said aqueous solution has a pH below about 2.0 and a temperature below about 85° F.

8. A method as claimed in claim 1, wherein said aqueous solution has a pH between about 1.7 and 2.0 and a temperature between about 70° and 85° F.

9. A method as claimed in claim 1, wherein said wood is sapwood of pole stock.

10. A method as claimed in claim 6, wherein said wood is sapwood of pole stock.

11. A method as claimed in claim 1, wherein said aqueous solution is Type C standard CCA solution, as specified in ASTM standard D1625-71, to which said polyethylene glycol is added prior to said exposing step.

12. A wood pole produced by a process comprising the step of treating a wood pole with an aqueous solution consisting essentially of water, hexavalent chromium, copper, arsenic and polyethylene glycol, said wood pole displaying at least one characteristic of improved climbability and resistance to checking.

13. A wood pole as claimed in claim 12, wherein said polyethylene glycol has a molecular weight in the range about 100 to about 2,000.

14. A wood pole as claimed in claim 12, wherein said molecular weight is in the range from about 500 to about 2,000.

15. A wood pole as claimed in claim 14, wherein said process comprises the step of treating said wood pole with an aqueous solution consisting essentially of (1) water, (2) about 2 to 2.5% concentration of chromium, copper and arsenic salts or oxides and (3) about 0.5% to 10% concentration of a polyethylene glycol having a molecular weight of about 1,000.

16. A wood pole as claimed in claim 12, wherein said aqueous solution further consists essentially of a surface active agent.

17. A wood pole as claimed in claim 12, wherein said treating step comprises treating said wood pole in a chamber by evacuating said chamber for a first predetermined period after placing said wood in said chamber, and then pressure treating said wood with said aqueous solution at a predetermined pressure for a second predetermined period.

18. A wood pole as claimed in claim 12, wherein said aqueous solution has a pH below about 2.0 and a temperature below about 85° F.

19. A wood pole as claimed in claim 12, wherein said aqueous solution has a pH between about 1.7 and 2.0 and a temperature between about 70° and 85° F.

20. A wood pole as claimed in claim 12, wherein of said wood pole comprises sapwood which is softened by said treating step 21. A wood pole as claimed in claim 12, said wood pole being a telecommunications or electric power pole.

22. A wood pole as claimed in claim 12, wherein said aqueous solution is Type C standard CCA solution, as specificed in ASTM standard D1625-71, to which said polyethylene glycol is added prior to said exposing step.

* * * * *